July 14, 1970    H. H. WIESNER    3,520,574

TRACK CHAIN LINK FOR VEHICLES

Filed June 21, 1968                2 Sheets-Sheet 1

INVENTOR
Hagen Heinz WIESNER

By

July 14, 1970   H. H. WIESNER   3,520,574
TRACK CHAIN LINK FOR VEHICLES
Filed June 21, 1968   2 Sheets-Sheet 2

INVENTOR
Hagen Heinz WIESNER

United States Patent Office 3,520,574
Patented July 14, 1970

3,520,574
TRACK CHAIN LINK FOR VEHICLES
Hagen Heinz Wiesner, Burg (Wupper), Germany, assignor to Diehl K.G., Remscheid, Germany
Filed June 21, 1968, Ser. No. 739,030
Claims priority, application Germany, June 23, 1967, D 53,414
Int. Cl. B62d 55/26
U.S. Cl. 305—38
1 Claim

ABSTRACT OF THE DISCLOSURE

A track link unit comprising a track link with grooves forming a sliding path for receiving an insert comprising two plate members and a resilient rubber layer interposed between and connected to said plate members, one of said plate members having a ground engaging member connected thereto and being provided with lateral flange-like extensions forming sliding means engaging said grooves, while said other plate member is provided with resilient latch means for locking engagement with recess means in the track link when said insert has been fully inserted into said track link unit.

---

In assignee's U.S. Pat. No. 3,266,853 there is described a track chain link unit with a plate-shaped sliding part which is adapted to be interlocked with the track chain link, said plate-shaped sliding part having that side thereof which is intended to face the ground provided, for instance, with a pad, a steel projection, or a snow or mud rake. The said plate-shaped sliding part is adapted to be moved into oppositely located grooves of the track chain link until it hits an abutment, said plate-shaped sliding part resting on a step of the track chain link by means of a resilient interlocking member in a direction opposite to the direction in which said plate is being inserted.

It has been found that with insertable pads of the above-mentioned type, relatively close tolerances are necessary with regard to the parts, i.e. with regard to the chain links as well as the sliding parts, because with greater tolerances difficulties may be encountered as to the assembly and disassembly of the pads. If the pads fit too closely, additionally a disturbing noise occurs during the driving operation. Furthermore, it has been found that the ribs provided on the insertable plate for increasing the strength of said plate which carries the pads, considerably affect the springiness of the plate at the insert edges.

It is, therefore, an object of the present invention to provide a plate-shaped sliding part of the above-mentioned general type, which will overcome the drawbacks outlined above.

It is a further object of this invention to provide a plate-shaped sliding part which even when greater tolerances occur, will assure a safe fitting and a simple assembly and disassembly of the pad.

These and other objects and advantages of the invention will appear more clearly from the following specification in connection with the accompanying drawings, in which.

The above-mentioned objects have been realized by composing the sliding part of two plates which brace each other against each other by means of a resilient intermediate rubber layer. More specifically, the said sliding part is composed of a base plate provided with a resilient interlocking member, and an intermediate plate which has lateral strips or rails for insertion of the sliding part, said strips being preferably vulcanized to the intermediate rubber layer on or between said rubber layer and a rubber pad. For purposes of reducing the weight, the intermediate plate may be provided with perforations of round or any other shape.

The arrangement according to the invention has the advantage that the rubber layer between the base plate and the intermediate plate will permit a spring of the intermediate plate. In this connection, the thickness of said rubber layer may be so selected that the pad, even when adding the plus tolerances, i.e. with maximum insert grooves in the chain link, will have a preload which will suffice to prevent a loose fitting of the pad. Inversely, the rubber layer, when the minus tolerances are added to each other, i.e. with narrowest guiding grooves, will permit the intermediate plate to escape in view of the elasticity of the rubber layer therebelow.

Figure 4:
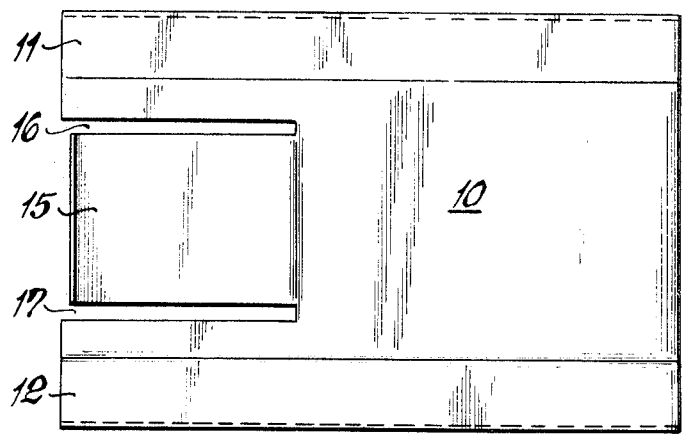
FIG. 4 is a top view of a base plate of the sliding part with interlocking member.

Referring now to the drawings in detail, a track chain link 1 is shown therein which in protruding transverse ribs 2 and 3 has grooves 4 and 5 facing each other. In these grooves 4 and 5 there is insertable an intermediate sheet 6 of a sliding part with two lateral strips or rails 7 and 8 which protrude beyond a pad 9. The intermediate plate 6 has vulcanized thereto a rubber layer 20 which is covered by a base plate 10. The base plate 10 comprises two inclined sections 11 and 12 on which inclined surfaces 13 and 14 of the track chain link 1 rest. An intermediate section 15 of the base plate 10 is separated from the laterally adjacent portion of plate 10 by means of two cuts 16 and 17 (FIG. 4) extending over approximately one-third of the total width and is slightly bent toward the track chain link 1. The sliding part is insertable from a longitudinal side of the track chain link up to an abutment 18 on the link 1. The track chain link 1 is additionally provided with a step or recess 19 to be engaged by the bent off section or locking section 15 of plate 10 when the sliding part has been inserted into grooves 4, 5 to such an extent that it abuts the abutment 18. Below said interlocking member 15 there is provided a recess 21 extending from the side. Said recess 21 serves for bending the part 15 by means of a tool so as to disconnect the hookup in the recess 19 and to permit moving said sliding part outwardly.

Figure 1:
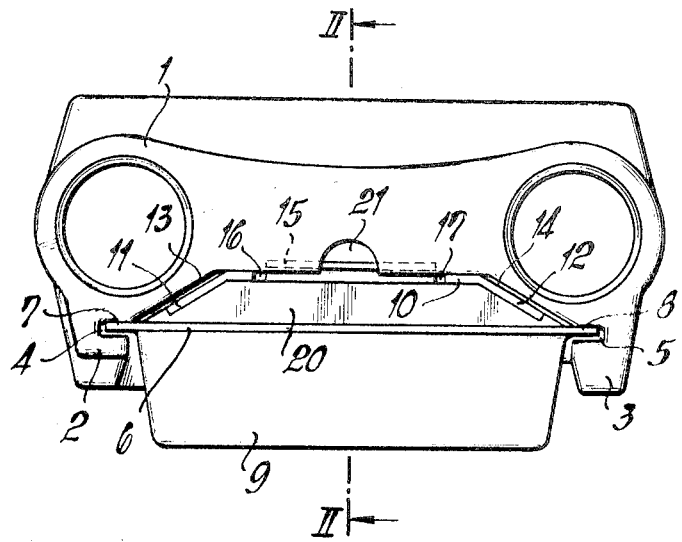
FIG. 1 is a front view of a track chain link with a sliding part according to the invention.
Figure 2:
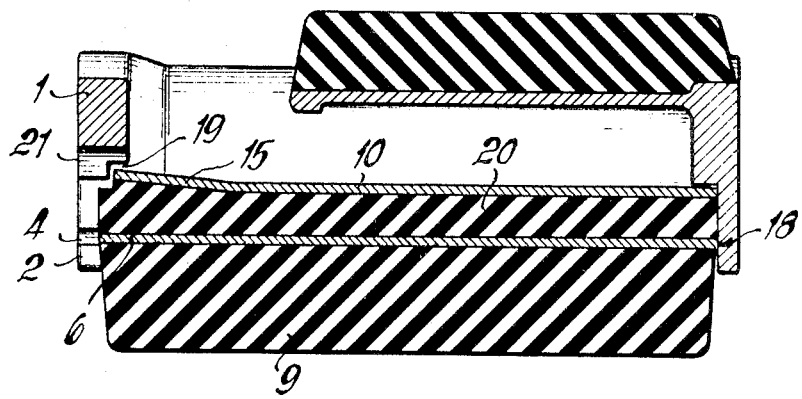
FIG. 2 is a longitudinal section through the track chain link and the sliding part according to the invention, said section being taken along the line II—II of FIG. 1.
Figure 3:
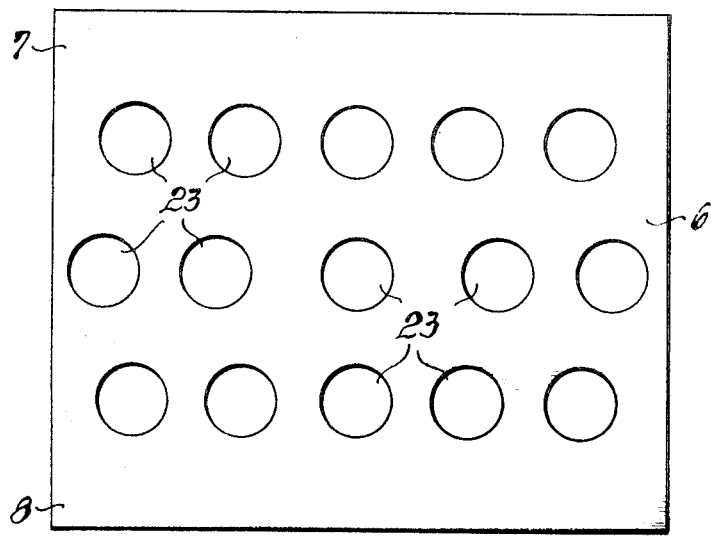
FIG. 3 is a top view of a supporting intermediate plate of the sliding part.

The intermediate plate 6 is in conformity with FIG. 3 provided with passages 23 in the form of bores which serve to reduce the weight of the sliding part but simultaneously also serve, especially with both sides covered by a rubber layer, for a better interlocking between the rubber and the intermediate plate 6.

Instead of a pad 9, the intermediate plate 6 may also be provided with welded-on ribs serving as snow and ice rakes.

It is, of course, to be understood, that the present invention is, by no means, limited to the particular structure shown in the drawing, but that the invention may have various modifications and is defined by the scope of the disclosure.

What I claim is:

1. A track link unit comprising: a track chain link having protruding transverse ribs defining grooves facing each other at opposite sides thereof forming a planar sliding path, said track chain link also being provided with recess means to one side of the sliding path, an insert having sliding means insertable into and slideable in said grooves, abutment means associated with said sliding path for abutment with said insert to limit the movement of said insert in said grooves, said insert comprising two plate members spaced from each other in first and second locations and a resilient layer of rubber material interposed directly between and connected to said two plate members, and a ground engaging member connected only to one of said plate members in the first location, said one plate member in the first location being provided with lateral flange-like extensions exclusively forming said sliding means identically for mating uniformly in planar guiding relationship with respect to the grooves of said ribs, and in the second location said other plate member being provided with resilient tongue latch means offset laterally away from the sliding path particularly for locking engagement only with said recess means in said track link to one side of the sliding path when said insert has been inserted into said track link unit to such an extent that said one plate member of said insert abuts said abutment, said resilient layer of rubber material being coextensive between said two plate members and including greater width thereof underneath said resilient tongue latch means bent laterally away from said plate member in the first location.

References Cited
UNITED STATES PATENTS

| | | | |
|---|---|---|---|
| 2,686,697 | 8/1954 | Baker | 305—35 |
| 3,266,853 | 8/1966 | Korner | 305—56 |
| 3,322,472 | 5/1967 | Ley | 305—36 |

RICHARD J. JOHNSON, Primary Examiner